United States Patent [19]

van der Lely et al.

[11] Patent Number: 5,778,820

[45] Date of Patent: Jul. 14, 1998

[54] APPARATUS AND METHOD FOR CONTROLLING FEED RECEIVED BY ANIMALS WHILE BEING AUTOMATICALLY MILKED

[76] Inventors: Cornelis van der Lely, 7 Brüschenrain, CH-6300 Zug, Switzerland; Karel van den Berg, 5 Boterbloemstraat, 2971 BR Bleskensgraaf, Netherlands

[21] Appl. No.: 633,811

[22] PCT Filed: Aug. 21, 1995

[86] PCT No.: PCT/NL95/00278

§ 371 Date: Apr. 16, 1996

§ 102(e) Date: Apr. 16, 1996

[87] PCT Pub. No.: WO96/05723

PCT Pub. Date: Feb. 29, 1996

[30] Foreign Application Priority Data

Aug. 23, 1994 [NL] Netherlands .................. 9401358
Oct. 31, 1994 [NL] Netherlands .................. 9401801

[51] Int. Cl.$^6$ .................................................. A01J 5/00
[52] U.S. Cl. .................................. 119/14.18; 119/14.02; 119/51.02
[58] Field of Search .................. 119/14.02, 14.08, 119/14.18, 51.02

[56] References Cited

U.S. PATENT DOCUMENTS

| 3,111,113 | 11/1963 | Jaquith | 119/14.02 X |
| 4,508,058 | 4/1985 | Jakobson et al. | 119/14.02 |
| 4,735,171 | 4/1988 | Essex | 119/51.12 |

FOREIGN PATENT DOCUMENTS

| 0 091 892 A3 | 10/1983 | European Pat. Off. . | |
| 91892 | 10/1983 | European Pat. Off. | 119/14.02 |
| 0 332 229 A3 | 9/1989 | European Pat. Off. . | |
| 0 395179 A1 | 10/1990 | European Pat. Off. . | |
| 0 630 560 A1 | 12/1994 | European Pat. Off. . | |
| 2 507 435 | 12/1982 | France . | |
| 2 623 688 | 6/1989 | France . | |
| 9200095 | 8/1993 | Netherlands . | |
| 1031245 | 6/1966 | United Kingdom . | |
| 190 574 | 11/1987 | United Kingdom . | |

OTHER PUBLICATIONS

International Search Report (PCT) for Netherlands Application No. 9401358, filed Aug. 23, 1994, which is in Dutch.

*Primary Examiner*—Robert P. Swiatek
*Attorney, Agent, or Firm*—Penrose Lucas Albright

[57] ABSTRACT

Apparatus and method for automatically milking animals, such as cows, including a milking robot with a laser detector for locating and emplacing teat cups on an animal's teats while in a milking compartment, milking the animal, and upon concluding the milking operation, withdrawing the teat cups and moving them from underneath the animal. The milking compartment has at its forward end a feeding trough and one or more devices for measuring the weight and/or quantity of fodder in the feeding trough. The apparatus also has a metering device for dispensing fodder, such as fodder concentrate, into the feeding trough. The metering device is computer controlled. With the aid of the computer, the anticipated feeding period is predetermined based on the animal's identity. The rate fodder is supplied to the feeding trough is based on that predetermined period and revisions thereto which may occur due to the teat cups not being placed upon the teats as quickly as expected, or the milking period being longer or shorter than expected, whereby the predetermined period of time is revised on an ongoing basis by experience and fodder is distributed at least substantially uniformly over the actual feeding period so dispensing of fodder terminates and the feeding period ends approximately at the same time that the milking operation ends and the milking robot has removed the milking apparatus from under the animal so as not to impede the animal's exit from the feeding compartment.

36 Claims, 2 Drawing Sheets

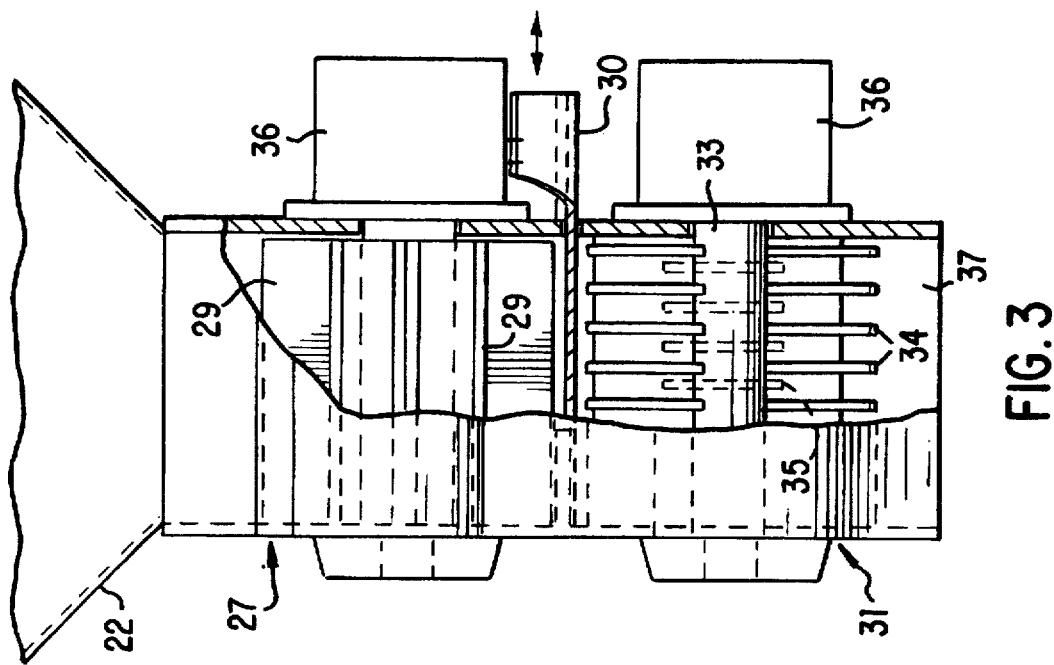
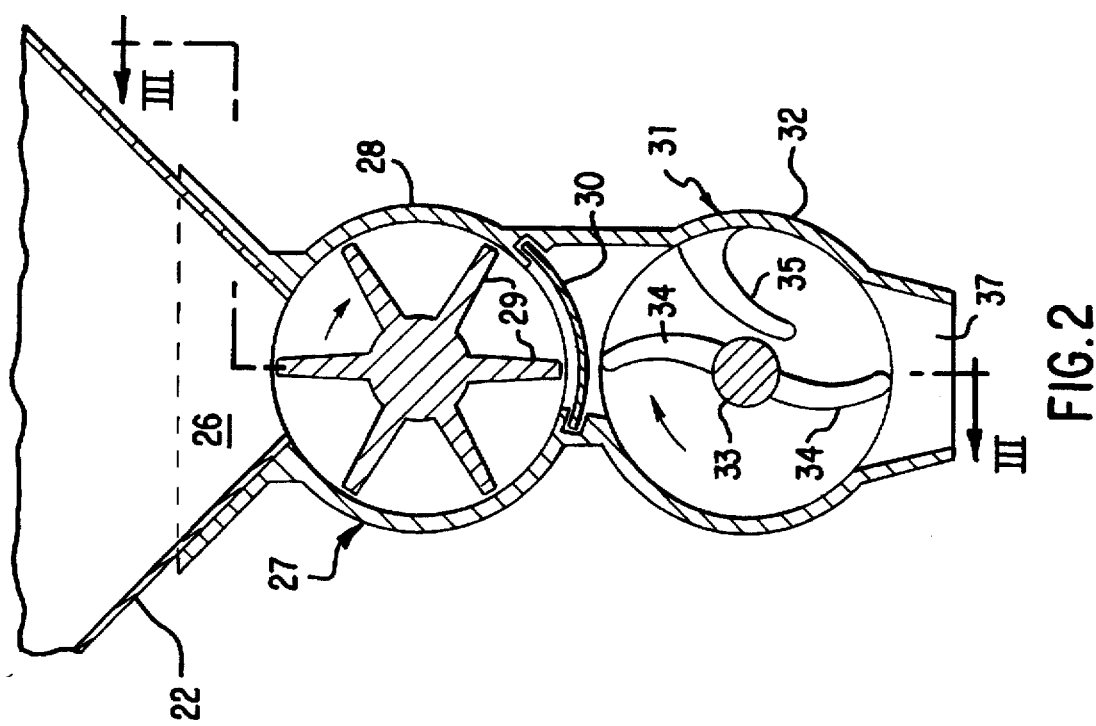

APPARATUS AND METHOD FOR CONTROLLING FEED RECEIVED BY ANIMALS WHILE BEING AUTOMATICALLY MILKED

FIELD OF THE INVENTION

The invention relates to an apparatus including a mechanism for milking animals, such as cows, equipped with a milking robot. In particular, it relates to a system in which the amount of and rate fodder is provided to a trough in the milking compartment to an animal being automatically milked therein is coordinated with the identity of the animal and the time it takes to milk the animal.

BACKGROUND OF THE INVENTION

Generally, automatic milking apparatus one or a plurality of feeding troughs, in which fodder is automatically supplied to the animals to be milked. Supplying fodder is usually effected by means of a concentrate metering system on the basis of data supplied by an animal identification system, in which an animal reporting at the feeding trough receives a predetermined quantity of fodder.

SUMMARY OF THE INVENTION

The invention has for its object to provide apparatus of the type discussed above, wherein it is possible to control the quantity of fodder to be distributed to an animal.

According to the invention, this is achieved in that the apparatus comprises a metering device for dispensing fodder, such as concentrate, as well as a computer, with the aid of which a feeding period is determined, the arrangement being such that a quantity of fodder to be dispensed to the animal is distributed uniformly or at least substantially uniformly over the feeding period. Using the above measuring device, it is possible to provide that until the end of the milking period a cow can always eat concentrate at leisure, which stimulates the milk production. In addition, it can be ascertained whether the animal's health has deteriorated.

In a preferred embodiment according to the invention, the measuring device comprises piezoelectric elements.

In accordance with a further feature of the invention, the implement comprises a feeding trough as well as one or more measuring devices for measuring the weight and/or the quantity of fodder in said feeding trough.

The invention still further relates to an apparatus including a mechanism for milking animals, such as cows, equipped with a milking robot, characterized in that the construction comprises a metering device for dispensing fodder, such as concentrate, as well as a computer, with the aid of which a feeding period is determined, the arrangement being such that a quantity of fodder to be dispensed to the animal is distributed uniformly or at least substantially uniformly over the feeding period.

In accordance with a further feature of the invention, the feeding period is approximately equal to the anticipated milking period for a relevant animal. By distributing the supply of concentrate uniformly over the anticipated milking period, the animal is more relaxed during milking.

In accordance with a further feature of the invention, it is furthermore possible for the feeding period to be approximately of equal length as the anticipated time required in preparation to milking, such as, e.g., cleaning of the teats, the teat cups in the animals teat premilking, etc. In accordance with a still further feature of the invention, the feeding period may also be approximately equal to the anticipated time required for an after-treatment of the teats and/or udder after milking. In a preferred embodiment, however, the feeding period is equal to the time required for the pre-treatment, the milking period and the after-treatment.

To ensure that, if the feeding period for a given animal has not yet elapsed while the pre-treatment and/or the milking and/or the after-treatment of the animal has/have already been finished, the animal remains in the milking/feeding box, the implement comprises, in accordance with a further feature of the invention, means for enabling an animal to leave a milking/feeding box, such as e.g. a computer-controlled exit door and/or expelling device, which means are not activated at least until after the feeding period has ended.

In accordance with a still further feature of the invention, if it has been established by the computer that the pre-treatment and/or the milking and/or the after-treatment has/have been finished while the feeding period of the relevant animal has not yet elapsed, the feeding period is adapted so as to provide that the animal receives the remaining quantity of fodder more rapidly.

In accordance with a further feature of the invention, the feeding period is automatically adjusted, after it has been found that prior to and/or during and/or after milking unwanted time delays have occurred, e.g. because an animal has kicked off a teat cup which has to be again emplaced, to ensure that the supply of fodder is as yet uniformly distributed over the remaining anticipated feeding period. By adjusting the feeding period, the entire portion of fodder to be dispensed is prevented from being finished prematurely, so that the animal is kept quiet and relaxed by the remaining portion of fodder still begin supplied to it, while the milking period is being completed.

In accordance with a feature of the invention, the metering device comprises means, so that it is always possible for relatively small portions of fodder to be dispensed into the feeding trough, whereby the animal can continue to be fed and relaxed not only during, but also following the milking process as controlled by the computer depending upon the circumstances In an embodiment according to the invention, the means, by which a relatively small portion of fodder can always be dispensed into the feeding trough, comprise a motor with a controllable number of revolutions and motor-driven blades. To stimulate the fodder consumption, the implement comprises, in accordance with a still further feature of the invention, a grinding device, by means of which the fodder to be dispensed can be ground. The invention, therefore, further relates to an apparatus including a mechanism for milking animals, such as cows, characterized in that the mechanism for feeding implement comprises a grinding device, by means of which the fodder to be dispensed to the animal can be ground. In accordance with a further feature of the invention, the grinding device is disposed near a metering device. In accordance with a still further feature of the invention, the grinding device comprises a plurality of fixed, spaced-apart grinding members.

In accordance with a further feature of the invention, the feeding trough is attached to the feeding box by means of a pivotal parallelogram construction.

Furthermore, in accordance with a feature of the invention, the milking robot, by means of which the teat cups can automatically be emplaced on the teats of an animal to be milked, is mounted on or adjacent the milking compartment.

In accordance with a still further feature of the invention, the apparatus comprises a cow identification system, with the aid of which the identity of the individual animals can be determined.

In accordance with a further feature of the invention, a computer program determines the quantity of fodder to be dispensed to the animal by the metering device per feeding period and/or per 24 hours' period. In addition, it is possible, in accordance with the invention, to determine for each animal, using the measuring device, how much fodder the animal has consumed throughout the predetermined feeding period. In accordance with a further feature of the invention, it is determined after each feeding period, using the measuring device, how much fodder has been left behind in the feeding trough, while in the computer this quantity is deducted from the quantity of fodder to be supplied to a subsequent, other animal reporting at the feeding trough. Thus, it is prevented that a subsequent animal gets the fodder left behind in the feed trough in addition to its predetermined quantity of fodder. In accordance with a still further feature of the invention, the quantity of fodder left behind in the feeding trough is added to the quantity of fodder the relevant animal receives in one or more subsequent feeding periods. This achieves that during a plurality of feeding periods per 24 hours' period the predetermined quantity of fodder for that 24 hours' period is supplied to the relevant animal.

In accordance with a further feature of the invention, it is possible to set in the computer a threshold value which represents the difference between the quantity and/or the weight of the fodder supplied during a feeding period and the fodder consumed by the animal, whereas, when this threshold value is exceeded, the computer gives a signal. The signal warns an operator that something may be wrong with the animal's health, which is advantageous in particular when a milking robot is used. In accordance with a characterizing feature of the invention, the attention signal is a light signal and/or a sound signal and/or a visible indication on a display screen and/or a print-out of an attention list of the computer. In accordance with a still further characterizing feature of the invention, exceeding the threshold value is used to check the health of an animal, and after the computer has found that the threshold value has been exceeded by a predetermined percentage, the animal is automatically isolated in a separate section, wherein the animal can be checked in greater detail by a supervisor or a veterinary surgeon. In accordance with a characterizing feature of the invention, isolating the animal is accomplished by means of a computer-controlled gate disposed close to the feeding/milking compartment.

In order to increase the rate at which the fodder is eaten, the feeding implement comprises, in accordance with the invention, means for adding a liquid, such as water, to the fodder. The invention, therefore, further relates to a construction including an implement for milking animals, such as cows, characterized in that the feeding implement comprises means for adding a liquid, such as water, to the fodder. The means for adding the liquid comprises, in accordance with the invention, a computer-controlled valve and a spraying device. Using the spraying device, it is possible to moisten fodder, such as cubes of concentrate.

In accordance with a further feature of the invention, the spraying device is disposed near the feeding trough.

In accordance with a still further feature of the invention, the milking compartment comprises a drinking bowl, in which, depending on the animal a quantity of liquid, such as water and/or milk, is supplied. The invention, therefore, further relates to a construction including a mechanism for milking animals, such as cows, equipped with a milking robot, characterized in that the mechanism comprises a drinking bowl, in which, depending on the animal, a quantity of liquid, such as water and/or milk, can be supplied. In accordance with a still further characterizing feature of the invention, the liquid is dispensed during the anticipated milking period and/or pre-treatment period and/or after-treatment period.

For a better understanding of the invention and to show how the same may be carried into effect, reference will now be made, by way of example, to the accompanying drawings, in which:

BRIEF DESCRIPTION OF THE DRAWINGS

FIG. 2 is a sectional view and enlarged detail of the fodder metering system of FIG. 1; and FIG. 3 is a side elevation view in partial section of the fodder metering system taken on the line III—III in FIG. 2.

DESCRIPTION OF THE PREFERRED EMBODIMENT

Figure 1:
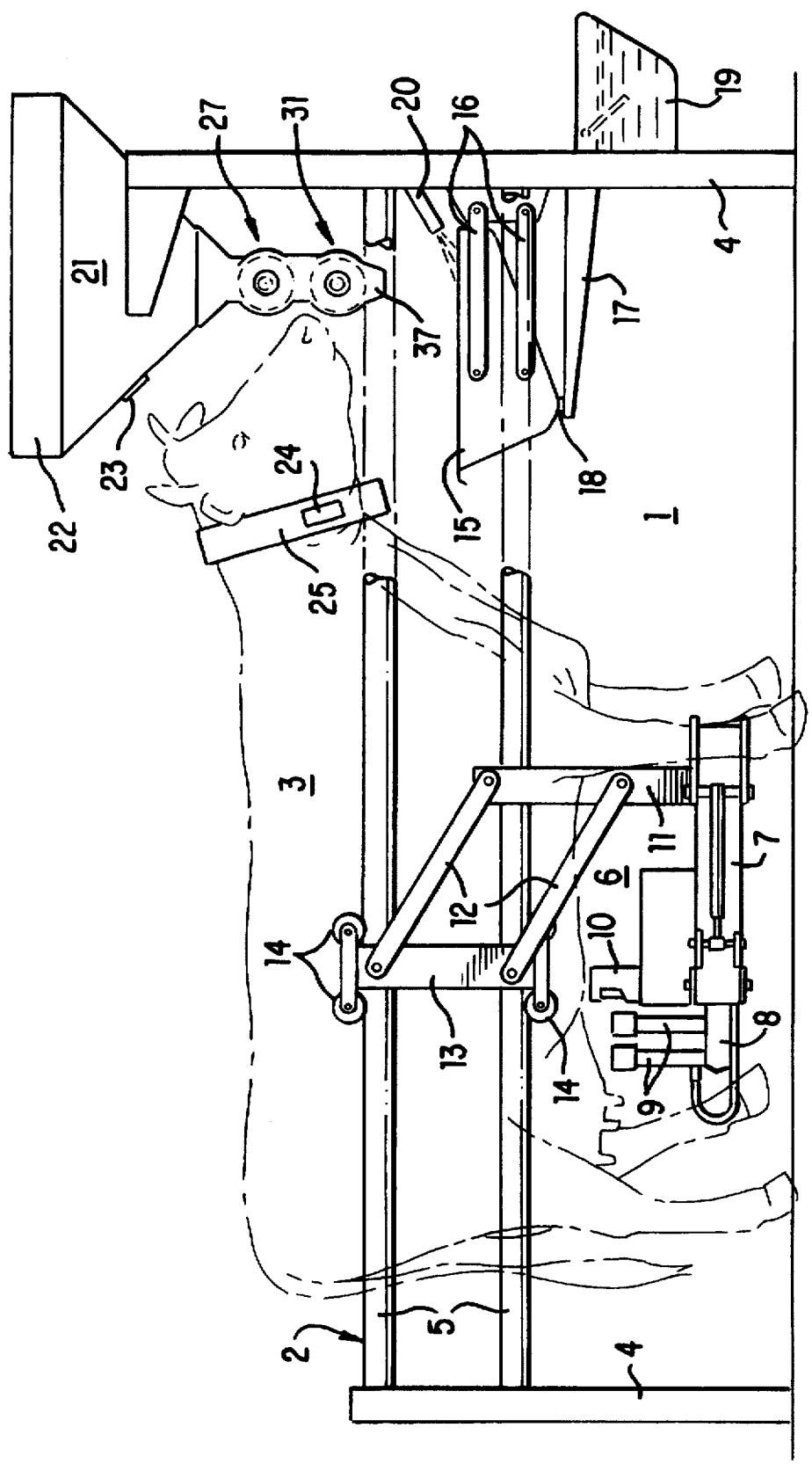
FIG. 1 is a side view of compartment in a mechanism for milking animals, including a milking robot, and a fodder metering system including a feeding trough with a measuring device for measuring the quantity of fodder in the feeding trough.

FIG. 1 is a side view of a milking/feeding compartment 1 which includes a railing 2 disposed along an animal 3 during its stay in the milking/feeding compartment 1. The railing 2 includes uprights 4, between which there are two cross-beams 5 which are arranged spaced apart from and parallel to one another. At one side of the milking/feeding compartment, a milking robot 6 is movably carried by and connected to a longitudinal upper beam of railing 2 and cross-beams 5. The milking robot 6 comprises a robot arm 7 having at its end teat cups 9 supported by a carrier 8. The robot arm 7 further accommodates near teat cups 9 a sensor 10, with the aid of which the position of the teats of an animal can be determined. The sensor may be a laser sensor. By means of hydraulic or pneumatic cylinder/piston members (not shown) robot arm 7 can be moved in the vertical direction as well as in a horizontal plane. Alternatively, the robot arm may be moved by means of electric motors. Furthermore, on the robot arm 7 there is disposed a vertical support 11 which is connected to a parallelogram construction 12. The other end of the parallelogram structure 12 is connected to a vertically extending supporting beam 13, which is provided at both ends with a pair of roller elements 14. The vertically extending supporting beam 13 is arranged by means of the roller elements 14 between a cross-beams 5 and an upper longitudinal beam of the railing 2. Using an electric motor, (not shown) the robot arm 7 can be moved in the lengthwise direction of the cross-beam 5 and the longitudinal beam of railing 2 by which it is carried.

Near the leading side of the milking/feeding compartment 1, a feeding trough 15 is attached to the upright 4. The feeding trough 15 is connected to the upright 4 by means of a parallelogram construction 16. When in its lowered position, feeding trough 15 is supported by a supporting beam 17. In addition, arranged between the supporting beam 17 and the bottom side of the feeding trough 15 there is a measuring device 18, with the aid of which the weight of the feeding trough 15 and its contents can be determined. In the present embodiment, the measuring device 18 comprises a piezoelectric element. Furthermore, at the exterior side of the milking/feeding compartment 1, a drinking bowl 19 is attached to the upright 4. Near the upper side of the feeding trough, a computer-controlled spraying device 20 is further attached to the upright 4, with the aid of which the fodder present in the feeding trough 15 can be moistened with a liquid, such as water. A metering device 21 for dispensing fodder into the feeding trough 15, such as concentrate, is attached over the feeding trough 15 to the upright 4. The metering device 21 includes a hopper 22 for the fodder. Against the outer wall of the hopper 22 there is attached a receiver 23 which is a sensor component of a cow identification system. The receiver 23 can receive signals from a transmitter 24, which by means of a collar 25 is worn around the neck of an animal.

FIGS. 2 and 3 illustrate in greater detail the concentrate metering device 21. At its bottom side, the hopper 22 has an aperture 26 with which a metering mechanism 27 is contiguous. The metering mechanism 27 comprises a blade wheel 29 accommodated in a cylindrical housing 28 and a computer-controlled metering slide 30 accommodated in the wall of the cylindrical housing 28. In addition, provided near the bottom side of the metering slide 30 there is a grinding device 31, with the aid of which the fodder measured out by the metering mechanism 27 can be ground. The ground fodder leaves the grinding device 31 via an opening 37 and drops into the feeding trough 15. The grinding device 31 includes a second cylindrical housing 32 which accommodates a drivable shaft 33, on which a plurality of spaced-apart knives 34 are fitted. Knives 35, which are likewise spaced apart from each other and are in a fixed position, are attached to the interior wall of the second cylindrical housing 32. During grinding of the fodder, the motor-driven plurality of knives 34 pass between the stationary plurality of knives 35 secured on the second cylindrical housing, as a result of which the fodder is ground. Both the fixed knives 35 and the drivable knives 34 are of a curved and moon-shaped design. Arranged at the exterior side of the two cylindrical housings 28 and 32 there are arranged electric motors 36, the rpm of which is selectively variable under the control of a computer. The electric motors 36 drive the blade wheel 29 and the rotatable knives 34, respectively.

The above-described construction including an implement for milking animals operates as follows:

After an animal 3 has entered via an entrance door (not shown), the milking/feeding compartment 1 and the transmitter 24 have come within the receiving range of the receiver 23, the animal 3 is automatically identified by the cow identification system. In addition, for each animal it can be stored in the computer how much fodder the relevant animal should receive per feeding period. The quantity of fodder to be supplied can be made to depend, in the computer, on the stage of the lactation period the animal is in. In the computer there is defined for each animal the relationship between the productivity of the animal and the related fodder consumption. Thereafter, using the computer, it is computed how much fodder the concentrate metering system 21 is to deposit per unit of time in the feeding trough 15 during the milking period, so as to provide that the quantity of fodder to be dispensed is distributed uniformly or at least substantially uniformly over the feeding period. The fodder doses deposited in the feed through 15 are measured so that the animal 3 can always eat some fodder during the feeding period in the milking/feeding compartment. Since animal 3 remains quiet during eating, it is possible for the sensor 10 to determine with great precision the position of the teats of the animal to be milked, and the teat cups 9 can be connected relatively quickly to the teats of the animal.

Using the measuring device 18, it is further determined how much fodder the relevant animal has consumed during the feeding period. If after the feeding period it is found that the animal has left fodder behind in the feeding trough, this quantity is stored in the computer in the file of the relevant animal as still owing to it and this quantity can optionally be added in one or more subsequent feeding periods. If thereafter another animal enters the milking/feeding compartment 1, then in the computer the quantity of fodder left behind in the feeding trough 15 is deducted from the quantity of fodder to be supplied to the relevant animal. The feeding trough may include means such as a trap door that can be selectively opened and closed and conduit leading therefrom by means, of which the feeding trough 15 can automatically be emptied before a further animal enters the milking/feeding box 1. Stored in the computer there is also a threshold value, which can be set by an operator and which represents the difference between the quantity and/or the weight of the fodder dispensed to and consumed by the animal during the feeding period. When this threshold value is exceeded, the computer outputs a signal. An operator can then be notified by means of an attention list print-out of the computer that one or more animals show deviations in the fodder consumption. In addition, a second threshold value may have been stored in the computer that the said first threshold value has been exceeded by a predetermined percentage. If the second threshold value is exceeded, the relevant animal is automatically isolated by means of a computer-controlled gate in a separate section.

To stimulate the consumption rate of the fodder, e.g. with highly productive animals, which must take in much fodder in a relatively short period of time, the electric motor 36 of the grinding device 31 is energized by the computer, so that fodder delivered by the blade wheel 29 to the grinding device 31 is ground. The fodder, ground or not ground, can optionally be moistened by means of the computer-controlled spraying device 20 so as to increase in this manner the rate of consumption still further. As the rpm of the electric motor 36 driving the blade wheel 29 is variable, it is possible to effect a very accurate, optionally continuous metering of the fodder in the feeding trough 15.

In addition, a computer-controlled drinking bowl, such as the drinking bowl 19, may be placed in or at the milking/feeding compartment 1, with the aid of which liquid, such as water and/or milk, can be supplied depending on the animal (FIG. 1). Furthermore, the liquid and/or (concentrated) fodder can preferably be supplied during the anticipated milking period and/or pre-treatment period and/or after-treatment period. Thus, it is possible to adapt the feeding and/or drinking period when it is found that the teat cups 9 cannot be emplaced on the teats of an animal in the anticipated period of time, or when the animal kicks off one or more teat cups and the milking cluster is to be connected again.

The invention is not limited to the features described in foregoing, but also relates to all the features shown in the drawings of otherwise disclosed herein.

Having disclosed our invention, what we claimed as new and to be secured by Letters Patent of the United States is:

1. An apparatus including a mechanism for milking animals, such as cows, equipped with a milking robot which comprises dispensing means that includes a metering device for dispensing fodder, animal identification means, a computer operatively associated with said animal identification means, said computer controlling the amount of and rate that fodder is dispensed to an animal being milked by said mechanism in accordance with a feeding period which is determined on the basis of the identification of the animal by said animal identification means and said computer and variations from an anticipated period for completing the milking operation for the relevant animal detected during the ongoing milking operation said fodder being distributed substantially uniformly over the feed period.

2. An apparatus as claimed in claim 1, wherein said computer includes means for adjusting the rate said metering device is distributing fodder by applying a signal thereto.

3. An apparatus as claimed in claim 1, wherein said feeding period for each identified animal is approximately equal to the period of time required to complete milking of the relevant animal based on recorded data of prior milking periods of said relevant animal.

4. An apparatus as claimed in claim 1, wherein said feeding period for the identified animal is equal to the time required for preparing for the milking operation including cleaning the teats and connecting the teat cups to the teats plus the premilking period plus the milking period plus the time required for disconnecting the teat cups from the teats and removing the teat cups from between the legs of the animals, data being recorded in said computer for each identified animal upon each milking thereof.

5. An apparatus as claimed in claim 1 comprising computer-controlled exit means which is not activated until said feeding period has ended.

6. An apparatus as claimed in claim 5 comprising detection means for (a) determining when milking has been completed for said identified animal, (b) comparing the time that said milking has ended with the anticipated time for the end of said milking and (c) adjusting the rate that said metering device dispenses fodder so that said feeding period ends after teat cups have been removed from the teats of said identified animal and when said milking robot is removed from between the legs of said identified animal.

7. An apparatus as claimed in claim 5, comprising operations detection means for determining if delays have occurred during said feeding period in premilking procedures, milking procedures and post milking procedures, such operations detection means being operatively associated with said metering device for reducing the rate that the fodder is being distributed so that said feeding period ends at approximately the same time that said post milking procedures end.

8. An apparatus as claimed in claim 1, wherein said metering device comprises a variable speed motor and blades for cutting said fodder driven by said motor.

9. An apparatus as claimed in claim 1, wherein said metering device comprises grinding means for grinding said fodder.

10. An apparatus as claimed in claim 9, wherein said metering device comprises a positive displacement metering means for dispensing said fodder at a selected rate, said grinding device being disposed near said positive displacement metering means.

11. An apparatus as claimed in claim 9, wherein said grinding device comprises a plurality of fixed, spaced-apart grinding members.

12. An apparatus as claimed in claim 1, further comprising means for adding a liquid to said fodder.

13. An apparatus as claimed in claim 12, wherein said means for adding a liquid comprises a computer-controlled valve and a spraying device.

14. An apparatus as claimed in claim 13, wherein said spraying device is mounted so as to spray liquid into said trough.

15. An apparatus including a mechanism for milking animals, such as cows, equipped with a milking robot for automatically milking an animal which mechanism comprises a feeding trough and a measuring device for continually measuring the weight of fodder in said feeding trough.

16. An apparatus as claimed in claim 15, wherein said measuring device further comprises a piezoelectric element.

17. An apparatus as claimed in claim 15 wherein said measuring device comprises a metering device for dispensing fodder, said metering device controlling the dispensing of fodder into said feeding trough so that the rate that fodder is dispensed into said feeding trough during the feeding period of the animal being milked is an ongoing function of the quantity of fodder already received in said feeding trough as it is being continually measured by said measuring device.

18. An apparatus as claimed in claim 17, wherein said feeding period is equal to the sum of the periods of time for the animal being milked automatically for (a) cleaning its udder and teats, (b) positioning said robot under said udder and emplacing teat cups included in said robot on said teats, (c) premilking, (d) milking, (e) disconnecting said teats cups from said teats, and (f) removing said robot from between the relevant animal's legs.

19. An apparatus as claimed in claim 15, comprising a milking compartment which is defined by a framework, a pivotal parallelogram construction connecting said trough to said framework.

20. An apparatus as claimed in claim 19, wherein said milking robot is movably mounted on said framework.

21. An apparatus as claimed in claim 20, comprising animal identification system.

22. An apparatus as claimed in claim 21, comprising an automatically controlled fodder dispensing means mounted on said framework for dispensing fodder into said trough at a controlled rate and in a controlled quantity and control means associated with said animal identification system for controlling the rate and quantity of fodder dispensed by said dispensing means into said trough based on data relating to the animal identified as being in said milking compartment.

23. An apparatus as claimed in claim 22, comprising measuring means associated with said measuring device for automatically determining for each animal received and identified in said milking compartment, how much fodder it has consumed from said trough over a predetermined length of time.

24. An apparatus as claimed in claim 23, wherein it is determined by quantity detection means associated with said measuring device, how much fodder remains in said trough when an animal exits from said milking compartment, such remaining amount of fodder being taken into account in determining the quantity and rate of fodder to be dispensed to the next identified animal entering said milking compartment to be milked.

25. An apparatus as claimed in claim 23, comprising reckoning means associated with said measuring device for determining how much fodder is left behind in said feeding trough when an identified animal exits said milking compartment, the determination of said fodder so left behind being used in calculating the amount of additional fodder to be allotted to said identified animal during a predetermined future period of time.

26. An apparatus as claimed in claim 25, comprising threshold signalling means which is activated by said reckoning means when the amount of fodder so left behind by said identified animal exceeds a predetermined threshold value.

27. An apparatus as claimed in claim 26, wherein said threshold signalling means includes signal means that consists of at least one of the following: (a) An electromagnetic signal; (b) A sound signal; (c) A message on a display screen; and/or (d) An attention list print-out of a computer.

28. An apparatus as claimed in claim 25, wherein said compartment is associated with an isolation space for selectively receiving animals that exit said compartment, a guidance system for guiding animals exiting from said compartment selectively into said isolated space, said guidance system being activated to cause animals exiting said compartment to be guided into said isolated space upon said threshold value being exceeded for the relevant animal.

29. An apparatus as claimed in claim 28, wherein said guidance system comprises a computer-controlled gate.

30. An apparatus as claimed in claim 15, comprising a milking compartment on which said feeding trough is mounted and a drinking bowl supported by said milking compartment.

31. An apparatus as claimed in claim 30 comprising fodder dispensing means for dispensing fodder into said trough and control means for controlling (a) the quantity of fodder introduced into the trough from said dispensing means, (b) the rate at which said fodder is so introduced into said trough and (c) the duration of time said fodder is introduced into said trough.

32. An apparatus as claimed in claim 31 further comprising means for selectively supplying a potable liquid into said trough during a predetermined portion of said feeding period.

33. A method of dispensing fodder to animals, such as cows, while they are being milked automatically by a milking robot in a milking compartment which has trough for feeding fodder to the animal while it is in the compartment for being milked, the method comprising the steps of:

A. identifying the animal in the compartment;
B. accessing information concerning the said animal that comprises;
  (1) the approximate quantity of fodder to be fed to the animal considering its productivity and condition; and
  (2) its anticipated time for pre-milking, milking and post-milking procedures; and
C. controlling the amount and rate of fodder that is dispensed to said trough as a function of the aforesaid accessed information, B(1) and B(2), said fodder being continually dispensed at a substantially uniform rate into said trough for substantially as long as the animal remains in said compartment.

34. A method in accordance with claim 33, comprising comparing the anticipated times with the actual time of premilking, milking and post-milking procedures as they occur and in response thereto changing the rate that fodder is dispensed into said trough so that the dispensing of said fodder into said trough is completed at approximately the same time as said post-milking procedures are completed and the animal is ready to exit said compartment.

35. A method in accordance with claim 34 further comprising supplying the animal in said compartment with a potable liquid selectively during said pre-milking procedure and/or said milking procedure and/or said post-milking procedure.

36. A method in accordance with claim 35, wherein the step of supplying potable liquid to said animal in said compartment comprises introducing said potable liquid into said trough so that it is mixed with fodder received therein.

* * * * *